United States Patent [19]

Borowski

[11] Patent Number: 4,817,966

[45] Date of Patent: Apr. 4, 1989

[54] ROTARY SHAFT BEARING ISOLATOR SEAL

[75] Inventor: Richard Borowski, Palmyra, N.Y.

[73] Assignee: Garlock Inc., Palmyra, N.Y.

[21] Appl. No.: 151,945

[22] Filed: Feb. 3, 1988

[51] Int. Cl.⁴ .............................................. F16J 15/16
[52] U.S. Cl. ........................................ 277/3; 277/25; 277/35
[58] Field of Search ...................... 277/25, 27, 1, 3, 13, 277/15, 35, 38, 39, 43, 53–57, 16, 17, 36, 37, 40–42, 50–52

[56] References Cited

U.S. PATENT DOCUMENTS

| | | | |
|---|---|---|---|
| 2,561,694 | 7/1951 | Gibert, Sr. | 277/25 |
| 2,888,281 | 5/1959 | Ratti | 277/25 |
| 2,960,356 | 11/1960 | Tyce et al. | 277/25 |
| 3,368,819 | 2/1968 | Otto | 277/37 |
| 3,627,390 | 12/1971 | Irwin | 277/25 |
| 4,022,479 | 5/1977 | Orlowski | 277/53 |
| 4,114,902 | 9/1978 | Orlowski | 277/53 |
| 4,175,752 | 11/1979 | Orlowski | 277/53 |
| 4,304,409 | 12/1981 | Orlowski | 277/53 |
| 4,428,586 | 1/1984 | Romero | 277/25 |
| 4,462,285 | 8/1984 | Toyoda et al. | 277/25 |
| 4,462,600 | 7/1984 | Johnston | 277/25 |
| 4,466,620 | 8/1984 | Orlowski | 277/53 |
| 4,565,378 | 1/1986 | Wehrfritz et al. | 277/3 |
| 4,572,516 | 2/1986 | Symons et al. | 277/50 |
| 4,572,517 | 2/1986 | Rockwood, et al. | 277/53 |
| 4,706,968 | 11/1987 | Orlowski | 277/53 |

Primary Examiner—William A. Cuchlinski, Jr.
Assistant Examiner—Peter Arsenovic
Attorney, Agent, or Firm—Sixbey, Friedman, Leedom & Ferguson

[57] ABSTRACT

A bearing isolator seal having a shaft seal assembly that includes a stator housing having an inner radially extending face with an annular flange of substantially frusto-conical shape that extends from a larger diameter end that is fixed to the inner radially extending face to a smaller diameter free end, and a rotor having a peripherally extending radial flange of substantially frusto-conical shape that is provided with a smaller diameter end that is fixed to a hub of the rotor, a larger diameter free end, and a contact sealing surface therebetween, the free end being biased into contact with the inner radially extending face of the stator housing and the contact sealing surface being biased into contact with the free end of the annular flange of the stator housing under static seal conditions, the rotor being constructed in a manner causing these areas of contact to be broken under the effect of centrifugal forces generated by rotation of the rotor with the shaft. In accordance with another feature of the preferred embodiments, drain ports are provided at a radially inner side of the fixed end of the annular flange of the stator housing, and radially extending V-grooves are provided in an axial end surface of the rotor so as to cause lubricant to be propelled radially outwardly against the angled annular flange of the stator housing, along which it is cause to flow to and through axially extending holes forming the drain ports under dynamic sealing conditions.

26 Claims, 5 Drawing Sheets

ROTARY SHAFT BEARING ISOLATOR SEAL

BACKGROUND OF THE INVENTION

1. Field of the Invention

The present invention relates to rotary shaft seals which prevent lubricants associated with shaft bearings from leaking externally of the bearing housing or bearing support as well as for preventing foreign particles in the environment from working themselves through the seal into the lubricant. In particular, the present invention is directed to labyrinth and other dynamic type rotary shaft seals designed for such purposes.

2. Description of Related Art

Typical labyrinth type rotary shaft seals are shown in Rockwood, et al. U.S. Pat. Nos. 4,572,517; and 4,022,479, 4,114,902, 4,175,752, 4,304,409, 4,706,968, and 4,466,620, all to Orlowski. In such typical labyrinth type seals, internal labyrinth type grooves are provided in a metal seal ring which is fixed to a bearing housing. These grooves are specifically contoured to create an hydraulic dam effect that acts to remove lubricants moving axially along the shaft and pass them back into the bearing housing. Additionally, such labyrinth type seals are provided with sealing rings for preventing material from moving internally into the housing. However, a problem associated with this type of conventional seal is that there is no complete seal between the internal and external sides of the seal so that some material is permitted to move through the seal into the bearing housing. Furthermore, since the sealing ring wears due to the rotation of the shaft relative to the sealing ring, eventually a state is reached where sufficient foreign particles have entered into the housing which leads to damage of the shaft bearings. Furthermore, labyrinth type seal designs are ineffective when shaft conditions exist such as misalignment (a condition where the center line of the shaft is displaced perpendicularly with respect to the center line of the bore of the bearing seal) and runout of the shaft (a condition where a radial rotational eccentricity exists due to bearing wear, shaft bending or warping, etc.).

As an alternative to the labyrinth groove type seal, rotary shaft seals are known which utilize a seal member that is disposed within a seal housing and which has one or more flange-like lips biased into engagement with a wall of the seal housing. However, since the sealing member is fixed onto the periphery of the rotating shaft so as to rotate with it, high frictional forces are created at the interface between the free end of the flange-like lip and the nonrotating wall of the housing against which it is biased. Examples of such shaft seals can be found in Otto U.S. Pat. No. 3,368,819; Romero U.S. Pat. No. 4,428,586; Johnston U.S. Pat. No. 4,462,600; Toyoda, et al. U.S. Pat. No. 4,465,285; Wehrfritz, et al. U.S. Pat. No. 4,565,378; and Symons, et al. U.S. Pat. No. 4,572,516. With such seals, even if centrifugal forces are utilized to vary the contact force of the flange-like lip against the housing so as to reduce the contact force with increasing shaft speed (see, for example, the above-indicated Toyoda, et al. and Symons, et al. patents), ultimately sufficient wear occurs as to defeat the effectiveness of the seal to such an extent as to require replacement thereof. On the other hand, while it has been proposed to have a flange-like seal lip serve as a contact seal only when the shaft is stationary or rotating slowly, the lip being lifted from the housing wall against which it engages upon a predetermined increase in the rate of shaft rotation (see the above-mentioned Wehrfritz, et al. patent), such a seal has required the use of a compressed gas to lift the flange-like lip and prevent the ingress of foreign matter at higher speed conditions. Such a seal also requires a labyrinth arrangement to prevent the ingress of compressed gas into the bearing and the egress of lubricant from the bearing, at such increased shaft rotation speeds, creating a costly and complicated sealing arrangement.

Thus, there is still a need for a bearing seal for rotary shafts which can be simply and economically constructed, yet will effectively eliminate both the movement of bearing lubricant from the seal housing and the movement of foreign particles into the bearings and lubricant from outside of the housing, and have a long wear life.

SUMMARY OF THE INVENTION

In view of the foregoing, it is a primary objective of the present invention to provide a rotary shaft bearing isolator seal which is simply and economically producible and usable, while being effectively wear-free in terms of its ability to prevent lubricant leakage and foreign particle entry.

It is a further object of the present invention to provide a shaft bearing seal which utilizes a flange-like sealing element to prevent lubricants and foreign particles from traveling through the seal under static conditions, but not under dynamic conditions.

Another object of the present invention is to provide a seal structure which, under dynamic conditions, utilizes centrifugal force effects to eliminate wear-causing sealing contact conditions.

An additional object of the invention is to provide a shaft bearing seal that utilizes the design of the seal structure, to remove lubricant and foreign particles via axially oriented drain ports, under centrifugal force effects, which will not require changes in bearing design or special installation conditions.

Still another object of the present invention is to provide a rotary shaft bearing seal which will allow for both static and dynamic sealing under flood conditions at either one or both sides of the seal housing.

These and other objects of the present invention are achieved in accordance with preferred embodiments wherein a bearing isolator seal has a shaft seal assembly comprising a stator housing and a rotor. The stator housing has an inner radially extending face with an annular flange of substantially frusto-conical shape that extends from a larger diameter end that is fixed to the inner radially extending face to a smaller diameter free end. The rotor has a peripherally extending radial flange of substantially frusto-conical shape that is provided with a smaller diameter end that is fixed to a hub of the rotor, a larger diameter free end, and a contact sealing surface therebetween. The larger diameter free end is biased into contact with the inner radially extending face of the stator housing and the contact sealing surface is biased into contact with the free end of the annular flange of the stator housing in a manner causing these areas of contact to be broken under the effect of centrifugal forces generated by rotation of the rotor with the shaft.

In accordance with another feature of the preferred embodiments, drain ports are provided at a radially inner side of the fixed end of the annular flange of the stator housing, and radially extending pumping grooves are provided in an axial end surface of the rotor so as to cause lubricant to be radially propelled outward against the angled annular flange of the stator housing, along which it is caused to flow to and through axially extending holes forming the drain ports.

In accordance with one embodiment, a pair of annular flanges cooperates with a pair of radial flanges which are arranged in a mirror image relationship, thereby enabling static and dynamic sealing under flood conditions at both sides of the seal. However, in accordance with other embodiments, a single annular flange coacts with a single radial flange, such that static and dynamic sealing is still achieved, but only one side can be subjected to flood conditions, a situation which would apply to most pump applications.

In accordance with other aspects of the invention, the bearing isolator seal can be formed of three or four components and with or without a metal mounting shell.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 1:
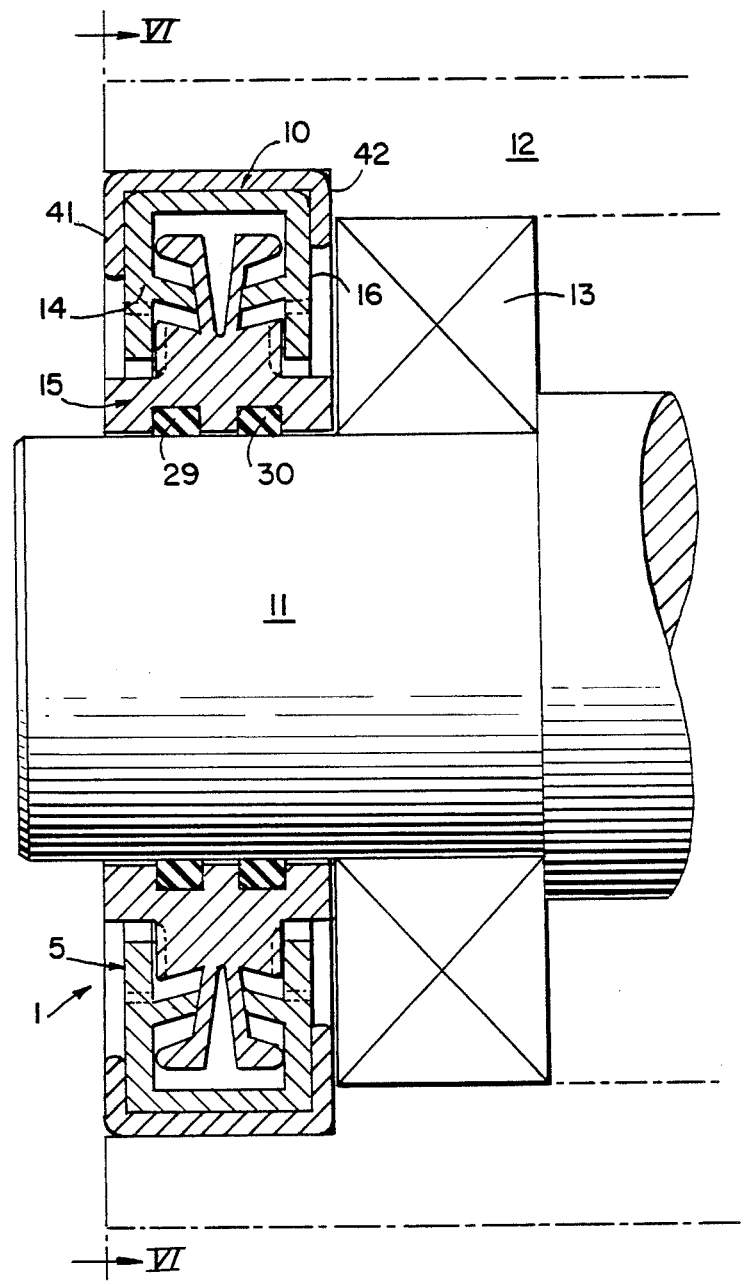
FIG. 1 is a vertical sectional view showing a bearing isolator seal in accordance with the present invention mounted adjacent a bearing on a rotary shaft.

At the outset, it is noted that throughout the various Figures of the drawings, corresponding components bear like reference numerals with prime (') designations being utilized to distinguish between embodiments. Furthermore, except where specifically stated otherwise, the terms "inner" and "outer" are used with reference to the axial center line or radial center plane of the seal, as appropriate, while the terms "interior" and "exterior" are used with respect to directions inwardly toward and outwardly away from the bearings in the bearing housing to be sealed.

Referring first to FIG. 1, a rotary shaft bearing isolator seal, designated generally by the reference numeral 1, in accordance with a preferred embodiment of the present invention, is shown mounted on a rotary shaft 11 within a bearing housing 12 (a portion of which is shown in broken lines). A conventional ball or tapered roller bearing 13 is shown conventionally journalled upon the shaft 11. Additionally, conventional means is provided to provide lubricant to the bearing 13.

The seal 1 serves to prevent leakage of the lubricant from the interior of the housing 12 and entry of foreign particles into the bearings 13 or lubricant from the exterior of the housing 12. To this end, seal 1 has a seal housing, forming a stator housing, which is designated generally by the reference numeral 5. Stator housing 5 is fixedly mounted to the bearing housing 12 via a metal mounting shell 10 that is secured in bearing housing 12 by an interference press fit. Additionally, the stator coacts with a rotor 15 which is fixed for rotation with the rotary shaft 11 by way of O-ring sealing elements 29, 30. Together, these components form a unitary bearing isolator seal that has characteristics in common with the initially-mentioned labyrinth and flange-like lip seals, but departs from the concepts of such seals in a way (which will become clear from the following description) that achieves static and dynamic sealing, even under flood conditions at either one or both sides of the stator housing 5, without the wear-associated problems and other deficiencies of such seals.

Figure 2:
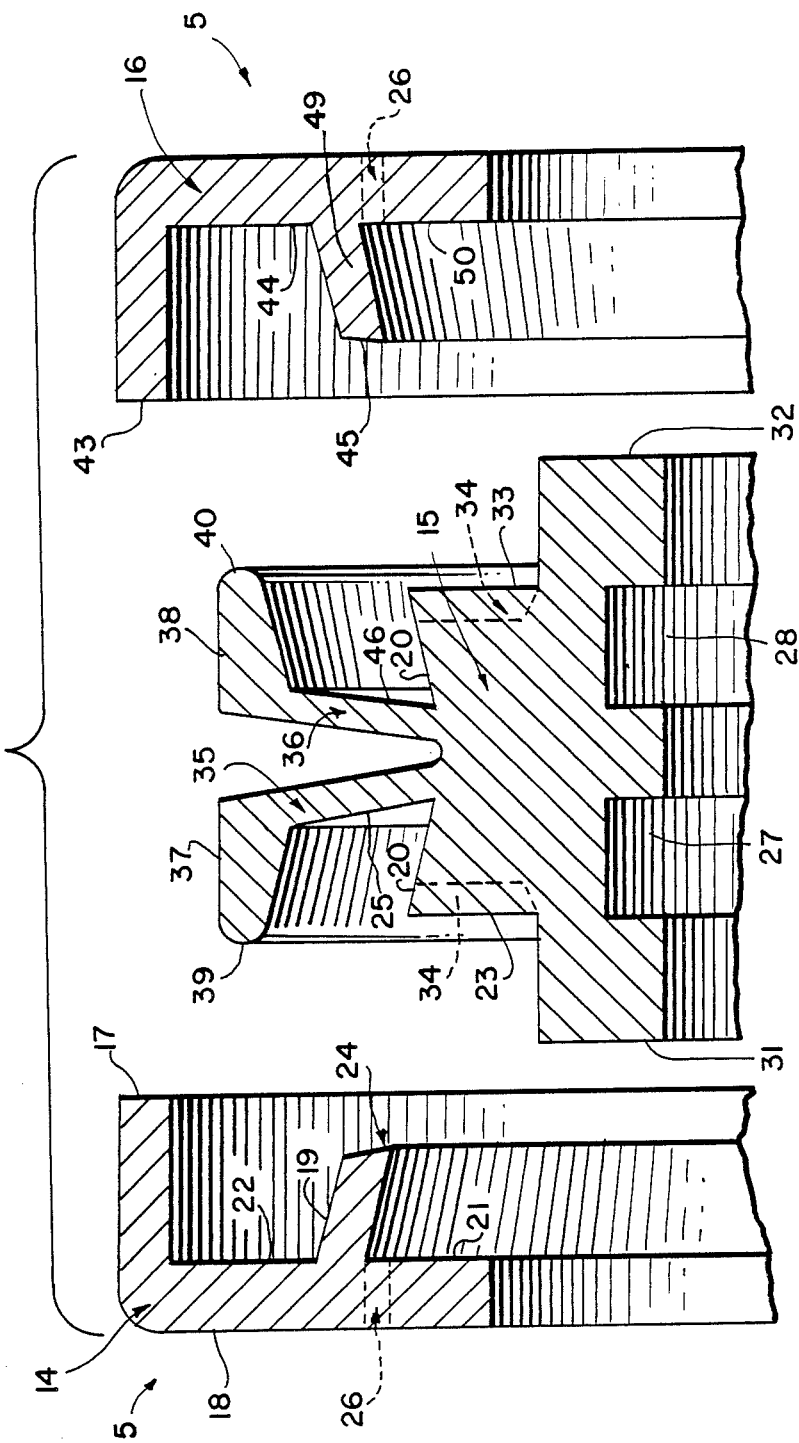
FIG. 2 is an enlarged exploded partial sectional view of the seal of FIG. 1 with the shaft mounting O-rings removed.

Turning now to FIG. 2, it can be seen that, in accordance with this first embodiment, the stator housing 5 is formed of a two-piece construction comprising a first stator housing ring 14 and a mating second stator housing ring 16, which are held together within the metal mounting shell 10 by its radially inwardly directed flanges 41, 42. In this regard, it is noted that the first stator housing ring 14 has an axially inner end 17 for abutting against the corresponding inner end 43 of the second stator housing ring 16, and the shell 10, by its flanges 41, 42 compresses the rings 14, 16 to produce abutting contact at ends 17, 43 under compressive forces sufficient to preclude rotation of stator housing rings 14, 16 relative to the shell 10.

Figure 4:
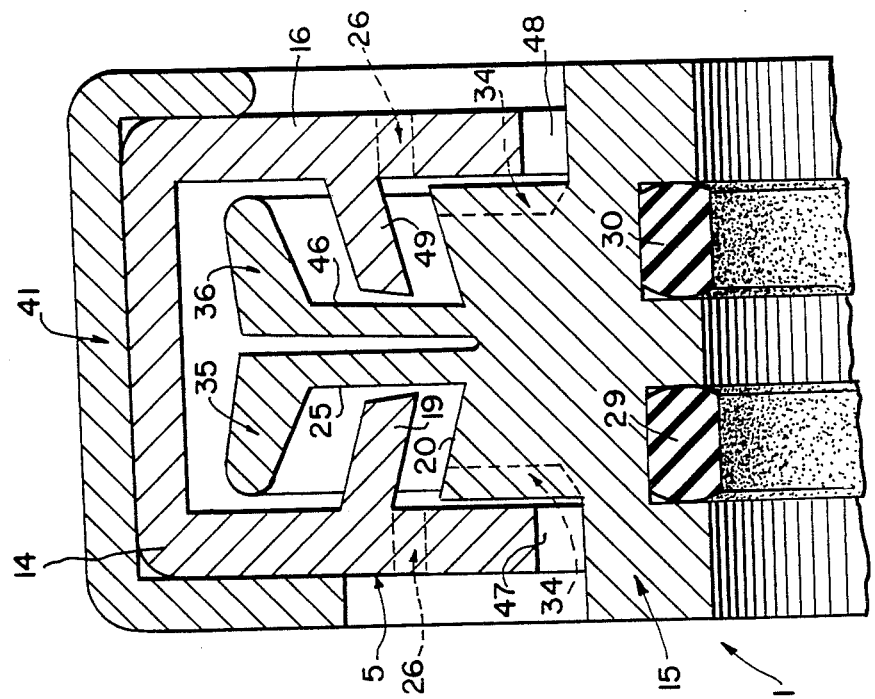
FIG. 4 is a view, similar to FIG. 3, but illustrating the seal of FIG. 1 in a dynamic sealing condition.
Figure 3:
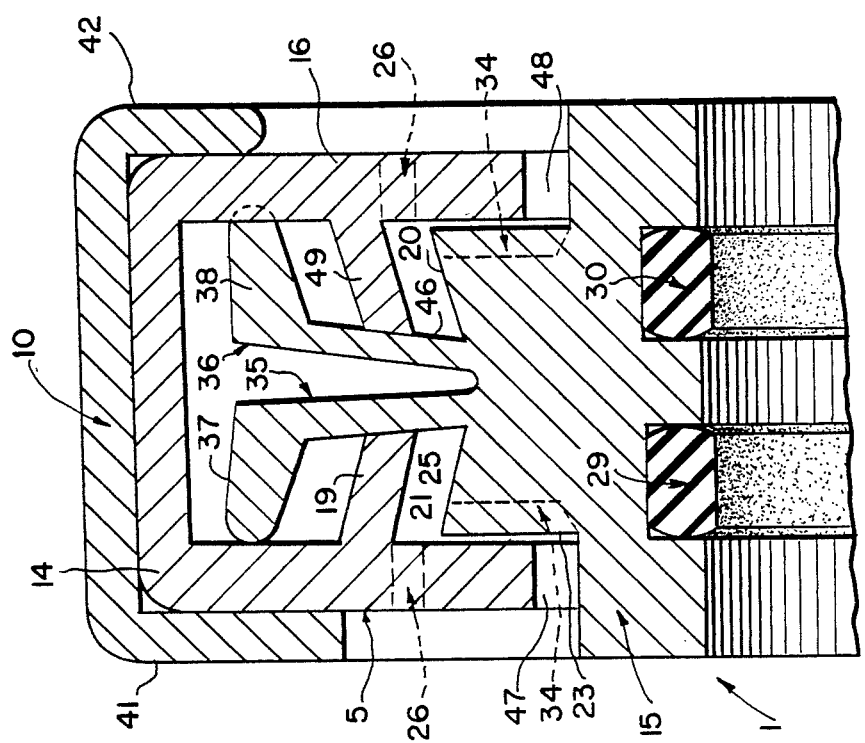
FIG. 3 is an enlarged partial, vertical sectional view of the seal of FIG. 1, but with the right-hand radial flange modified to illustrate certain aspects of the present invention, the seal being shown in its static sealing condition.
Figure 6:
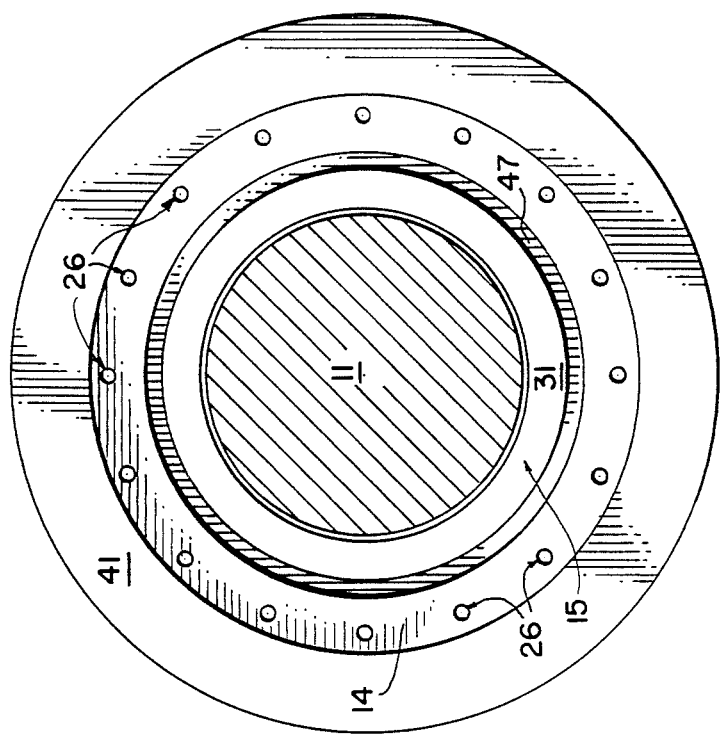
FIG. 6 is a vertical sectional view taken along line VI—VI of FIG. 1.

Furthermore, the first stator housing ring 14 is provided with a radially extending, axially facing end 18 from the inner side of which an annular flange 19 of substantially frusto-conical shape projects. The annular flange 19 is arranged so as to have a larger diameter end of the frusto-conical shape fixed to end 18 and a smaller diameter free end. The frusto-conical annular flange 19 divides the inner radially extending face of end 18 of stator housing ring 14 into a radially inner face portion 21 and a radially outer face portion 22. In the assembled condition shown in FIG. 3, radially inner face portion 21 is positioned alongside the recessed end face 23 of the hub of rotor 15, leaving a clearance gap, preferably, of approximately 0.010 inches. As also shown, end 18 of ring 14 is provided with a centrally positioned aperture through which an axial end 31 of the hub of rotor 15 extends, and (as can be appreciated from FIG. 6) an annular array of axially extending through-holes 26 (shown in broken lines in FIGS. 2-4) which, as explained later on, serve as drain ports. In a similar manner, the second stator housing ring 16 is provided with the noted inner end 43, and its inner radially extending face is subdivided into radially inner and outer face portions 50, 44, respectively, by a frusto-conical annular flange 49 with an annular array of drain ports 26 being associated therewith, and with a central aperture for axial hub end 32 being provided. Thus, the first and second stator housing rings 14, 16 can be constructed as identical parts that are merely mounted in mirror image fashion with respect to each other.

The rotor 15 has a pair of radial flanges 35, 36 extending about its periphery. The flanges 35, 36 extend at equal and opposite angles to a radial plane passing through the center of the rotor 15 and are provided with an axially extending end portion 37, 38 at the outermost end of the radial flanges 35, 36, respectively. End portions 37, 38 have radiused annular end faces 39, 40, respectively. The use of radiused end faces 39, 40 in combination with the substantial degree of radial space available between the stator housing rings 14, 16 and the outer peripheral surfaces of the rotor 15 allows for a considerable amount of shaft-to-bore misalignment and runout to exist without affecting the static sealing capabilities of the bearing isolator seal 1, which are achieved by abutment of the radiused faces 39, 40 with the radial outer face portions 22, 44 of the rings 14, 16 together with the sealing engagement occurring between the end faces 24, 45 of the annular flanges 19, 49 with the contact sealing surfaces 25, 46 of the radial flanges 35, 36. In this regard, the end faces 24, 45 may be radiused in the same manner as end faces 39, 40 in order to obtain similar benefits relative to insuring that they sealingly engage contact sealing surfaces 25, 46 despite the existance of misalignment or runout.

The stator housing rings 14, 16 and the rotor 15 can all be of any flexible wear-resistant material, such as carbon filled polytetrafluorethylene. Furthermore, the distance between the faces 22, 44 in the assembled condition of the stator 5 should be less than the distance between the radiused faces 39, 40 of the radial flanges 35, 36, prior to assembly of the seal 1 so that the flanges 35, 36 will be somewhat axially deflected toward each other in a static assembled condition of the seal 1. In this regard, with reference to FIG. 3, the broken line illustrated radiused face portion of flange 36 depicts the position it would assume but for the presence of radial face portion 44 of stator housing ring 16, while flange 35 is shown in the position actually assumed upon assembly, whereby the flange is deflected from its natural position (as shown for flange 36) by the securement together of the rings 14, 16 by the shell 10.

In the assembled condition as shown for flange 35, when the seal is new, it is possible that only partial contact or a clearance gap of 0.002–0.004 may result between the end faces 24, 45 of the annular flanges 19, 49 relative to the contact sealing surfaces 25, 46, respectively. However, due to the tight sealing contact between the radiused faces 39, 40 of the flanges 35, 36 with respect to the radial face portions 22, 44 of the rings 14, 16, an effective static seal will still be achieved, while the slight wearing of the faces 39, 40 which will occur on startup and shutdown of rotational operation of the shaft 11 will ultimately bring the contact sealing surfaces 25, 46 into full sealing engagement with the end faces 24, 45 of the annular flanges 19, 49. On the other hand, significant and potentially disabling wear of the radial flanges 35, 36 under dynamic conditions is avoided since, by the time that the shaft 11 reaches even a low operational speed, due to the mass given to the axially extending end portions 37, 38 of the radial flanges 35, 36 and the centrifugal forces acting thereon, these end portions 35, 36 have moved sufficiently toward each other and the central radial plane of the seal 1 as to cause contact to be broken between the radiused faces 39, 40 relative to the radial face portions 22, 44 and between end faces 24, 45 of annular flanges 19, 49 and the contact sealing surfaces 25, 46, so that no binding or frictional heat buildup will occur between them. Thus, under dynamic conditions, the seal 1 no longer achieves sealing by physical engagement between the rotor 15 and stator housing 5, but rather such is produced due to the specific labyrinthine construction of the seal 1 that will now be described.

Figure 5:
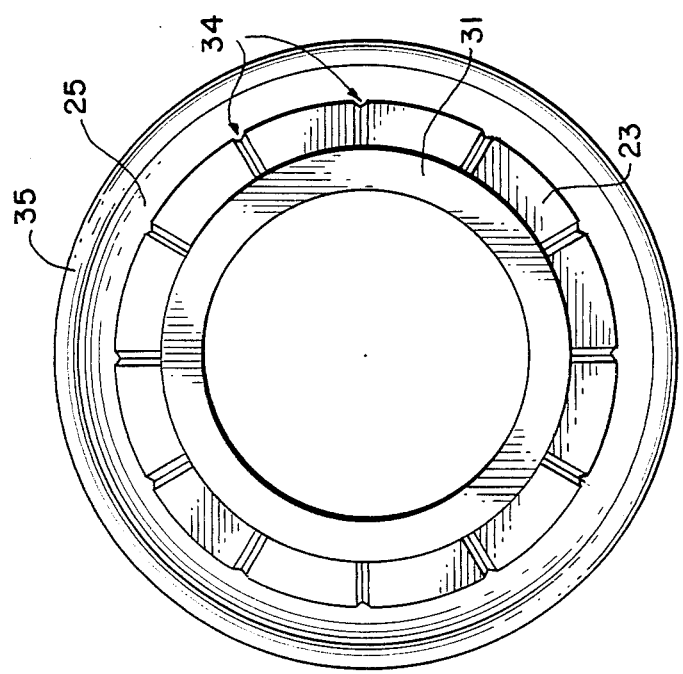
FIG. 5 is a vertical end view of a rotor of the seal of the FIG. 1 embodiment.

Under dynamic sealing conditions, lubricant or foreign matter may enter the stator housing 5 through the annular spaces 47 and 48 which exist between the stator housing rings 14, 16 and the rotor 15, but sheer forces acting in the gaps between the walls 23, 21 and 33, 50 will cause the lubricant and/or foreign matter to be directed to recessed radial pumping grooves 34 (which are preferably rounded or V-shaped grooves) that are provided in the recessed end faces 23, 33 in a uniformly spaced manner around the rotor (see FIG. 5). Because of the tolerances provided between the faces 23, 33 and the faces 21, 50, a pumping action is able to be created by the pumping grooves which propels the lubricant and foreign matter through the grooves 34 and outwardly against the inner side of the annular flange 19, 49 where centrifugal forces will cause the material to move along the flanges to the drain ports 26 and out of the stator housing 5. Any lubricant or foreign matter which may collect upon the frusto-conical peripheral wall 20 of the rotor 15 when shaft 11 is stationary, or any lubricant or foreign matter which is being statically sealed by the interaction between the radial flanges 35, 36 and the annular flanges 19, 49 will, upon startup of the shaft 11, travel along the underside of the frusto-conical annular flanges 19, 49 and the peripheral surface 20 of the rotor 15 away from the radial flanges 35, 36 to the drain ports 26. As a result, such lubricant or foreign matter will not pass radially outwardly along the contact sealing surfaces 25, 46 of the radial flanges 35, 36 when they move axially inwardly from the static sealing condition of FIG. 3 to the dynamic sealing position of FIG. 4. It should also be appreciated that the pumping action used to produce the dynamic sealing will occur whether shaft rotation is clockwise or counterclockwise.

Figure 7:
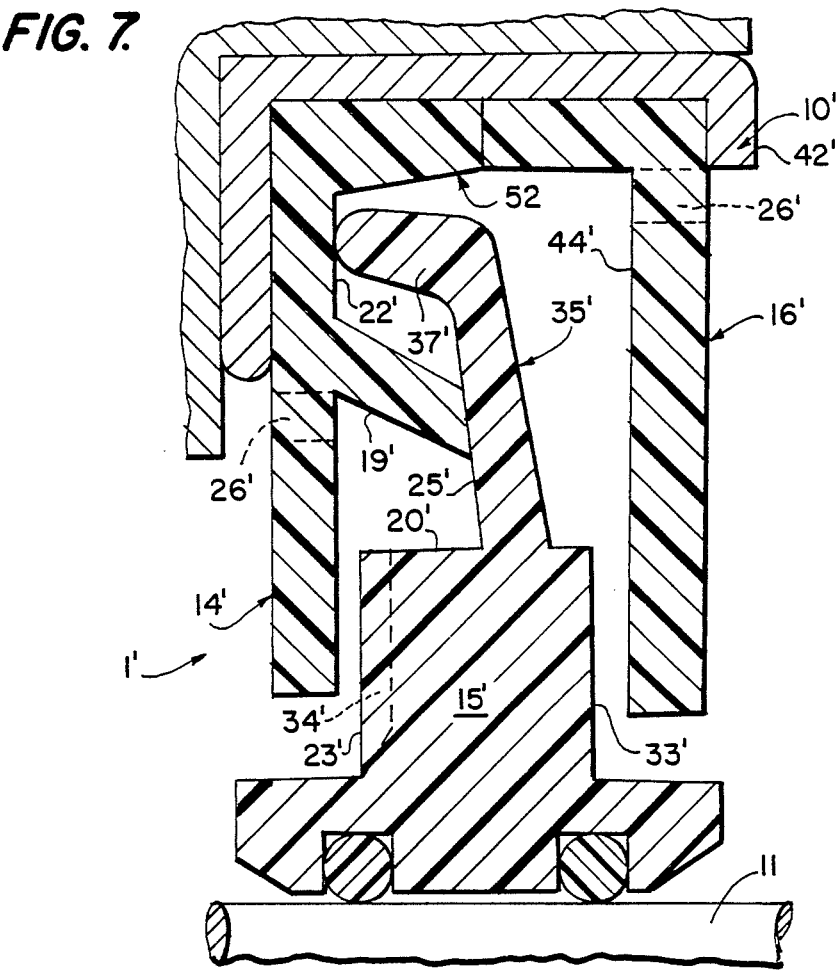
FIG. 7 illustrates a modified embodiment of a bearing isolator seal in accordance with the present invention that is suitable for use when flood conditions exist at only one side of the seal.

The isolator bearing seal 1, as described above, allows for both static and dynamic sealing under flood conditions at both the exterior and interior sides of the seal 1, i.e., at exterior end 18, as well as at the end of stator housing ring 16 which faces the interior of the bearing housing, and whether the seal is on a vertically or horizontally oriented shaft. However, in many applications, such as most pump applications, it is not necessary that static and dynamic sealing be achievable under flood conditions at both sides of the seal. For such applications, a seal 1', as is shown in FIG. 7, may be used. With respect to seal 1', it can be seen that the rotor 15' is provided with only a single radial flange 35' and the stator housing ring 16' is no longer provided with an annular flange 49. Thus, the left side of the seal as shown in FIG. 7 will allow for both static and dynamic sealing to be achieved under flood conditions, while the right side will be statically and dynamically sealed, but not under flood conditions.

In particular, the radial pumping grooves 34', like corresponding pumping grooves 34, will propel lubricant radially against the inner side of flange 19' for discharge via drain ports 26'; while under static conditions, the axially extending portion 37' of radial flange 35' will seal against radial face portion 22' of ring 14' and contact sealing surface 25' will seal against the end face of the frusto-conical annular flange 19'. On the other hand, at the right side of the seal, radial flange 42' of metal shell 10' has been shortened and the drain ports 26' of the ring 16' shifted to the end of inner radial face portion 44' to permit gravity drainage to be produced. Furthermore, the peripheral wall 52 of stator housing ring 14' tapers internally toward the drain ports 26' of the stator housing ring 16' in order to facilitate movement of lubricant away from the radial wall portion 22' of ring 14' and toward the drain ports 26' of ring 16'. Optionally, recessed rotor end face 33' may be provided with pumping grooves in the same manner as end face 23', despite the absence of an annular flange on radially extending surface 44' since such optional pumping grooves will direct lubricant toward drain ports 26', nevertheless, under dynamic conditions.

Figure 8:
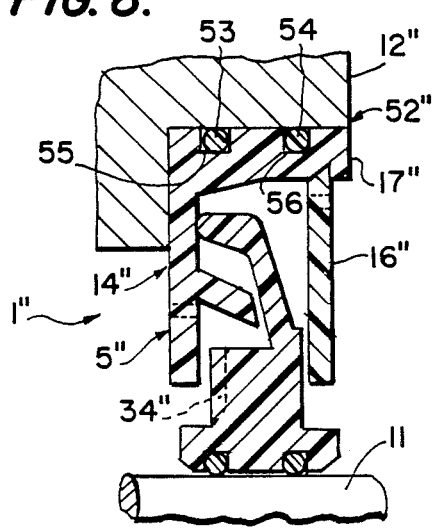
FIG. 8 illustrates a seal, similar to that of FIG. 7, but modified so as to eliminate the need for a metal mounting shell.

In FIG. 8, a modification of the FIG. 7 embodiment is shown which enables the use of a metal mounting shell to be dispensed with. To this end, for mounting of the stator housing 5" to bearing housing 12" a pair of O-ring seals 53, 54 are disposed in annular grooves 55, 56 of peripheral wall 52' (which has been extended to run the full axial length of the stator housing 5"). Additionally, for producing a unitary seal, stator housing ring 16" is formed as an annular disc and is snapped into place within an annular groove formed in the inner surface of peripheral wall 52" in proximity to the end 17" of stator housing ring 14". To facilitate the snapping into place of the ring 16', its outer edge is of a preferably wedge-like outwardly tapering shape, as is the groove into which it snaps. Apart from these distinctions, the FIG. 8 embodiment is identical to that of the FIG. 7 embodiment in both structure and operation.

Figure 9:
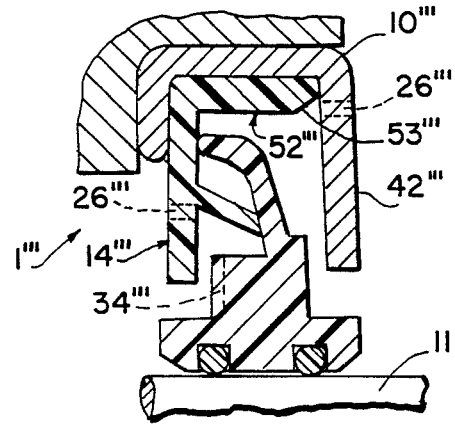
FIG. 9 is an embodiment similar to the embodiments of FIGS. 7 and 8, however modified to have a portion of a metal mounting shell serve as part of the stator housing of the seal.

As another means for reducing the number of parts of which the bearing isolator seal is formed, instead of modifying the stator housing ring to take over the role of the metal mounting shell, the metal mounting shell may be modified to take over the role of stator housing ring 16'. Such an embodiment is shown in FIG. 9. As can be seen from FIG. 9, metal mounting shell 10''' differs from mounting shell 10' in that its flange 42''' has been elongated and provided with drain ports 26''' in order to constitute a structural equivalent of stator housing disc 16' that has been integrated into the metal mounting shell. Furthermore, peripheral wall 52''' of stator housing ring 14''' extends fully to the flange 42''' and, in proximity to the drain ports 26''', is provided with a tapering surface 53''' that serves to direct lubricant to the drain holes 26''' for gravity drainage therethrough. Apart from these differences, the embodiment of FIG. 9 is otherwise identical to that of FIG. 7 in structure and function.

It should also be recognized by those of ordinary skill in the art that features of the embodiments of FIGS. 7-9 are applicable to that of FIGS. 1-6, and vice versa. For example, instead of the constant diameter peripheral wall 20' found on the hub of rotor 15' of the embodiments of FIGS. 7-9, this peripheral surface may be made frusto-conically in the manner of peripheral wall 20 of the embodiment of FIGS. 1-6, or peripheral wall 20 may be made annular (although a frusto-conical peripheral wall for the rotor hub is preferred for use in conjunction with the annular flange of the stator housing ring). Additionally, it is also possible for the embodiment of FIGS. 1-6 to be modified to eliminate the need for mounting shell 10 in a manner comparable to that utilized in FIG. 8.

Likewise, it should be apparent how the present invention will be susceptible of numerous other changes and modifications so that, even though several embodiments in accordance with the present invention have been shown and described, the present invention should not be considered as merely being limited to the details shown and described herein, but rather is intended to encompass all such changes and modifications as are within the scope of the appended claims.

I claim:

1. A rotary shaft bearing isolator seal comprising:
   a stator housing having an inner radially extending face;
   an annular flange of substantially frusto-conical shape extending radially and axially inwardly from a larger diameter end fixed to said radially extending face to a smaller diameter free end;
   a rotor disposed within said stator housing and having a flexible, peripheral radial flange, said radial flange extending radially and axially outwardly from a smaller diameter end fixed to a peripheral wall of said rotor to a larger diameter free end that is biased into contact with said radially extending face of the stator housing under static sealing conditions, and having a contact sealing surface between its fixed and free ends for sealing against said free end of said annular flange under static sealing conditions; and
   wherein said annular flange is constructed in a manner causing centrifugal forces generated by rotation of said rotor to overcome said biasing and displace said free end of the radial flange of the rotor out of contact with the radially extending face of the stator housing and said contact sealing face away from the free end of the annular flange of the stator housing.

2. A bearing isolator seal according to claim 1, wherein drain ports are provided in a wall of the stator housing defining said inner radially extending face at locations disposed in proximity to a radially inner side of said frusto-conical annular flange.

3. A bearing isolator seal according to claim 2, wherein said rotor has an end face positioned substantially parallel and in close proximity to a portion of said radially extending face of the stator housing and within which radially extending pumping grooves are formed as a means for propelling lubricant, entering between said rotor end face and said portion of the radially extending face of the stator housing, toward the radially inner side of said annular flange for discharge through said drain ports under dynamic sealing conditions.

4. A bearing isolator seal according to claim 3, wherein said pumping grooves are of V-shaped crossection.

5. A bearing isolator seal according to claim 4, wherein said rotor has a frusto-conical peripheral wall of a diameter which increases in a direction toward said drain ports.

6. A bearing isolator seal according to claim 3, wherein said rotor has a frusto-conical peripheral wall of a diameter which increases in a direction toward said drain ports.

7. A bearing isolator seal according to claim 3, wherein said stator housing has a first and a second said inner radially extending face in opposed relationship to each other, and a first and a second said annular flange in opposed relationship to each other, and wherein said rotor has a first and a second said radial flange, each of said radial flanges cooperating with a respective one of said first and second radially extending faces and annular flanges.

8. A bearing isolator seal according to claim 7, wherein said stator housing is formed of a pair of identical stator housing rings disposed in mirror image relationship to each other.

9. A bearing isolator seal according to claim 8, wherein said stator housing rings are secured together by a mounting shell for mounting of the stator housing to a bearing housing.

10. A bearing isolator seal according to claim 3, wherein a single said annular flange and a single said radial flange are provided, and wherein said stator housing has a plurality of gravity drain ports at a peripheral portion of a second inner radially extending face disposed on an opposite side of said radial flange from the inner radially extending face having said annular flange.

11. A bearing isolator seal according to claim 10, wherein said annular flange is provided on a first stator housing ring, said first stator housing ring having a peripheral wall; wherein said peripheral wall has an external surface in which O-ring seals are disposed for mounting of the stator housing to a bearing housing; and wherein said second inner radially extending surface is formed by an inner surface of an annular, disc-like, second stator housing ring that is snapped into an inner circumferential groove in an inner surface of the peripheral wall of the first stator housing ring.

12. A bearing isolator seal according to claim 11, wherein said peripheral wall has a tapering section for guiding lubricant to said gravity drain ports.

13. A bearing isolator seal according to claim 10, wherein said annular flange is provided in a stator housing having a peripheral wall; wherein the peripheral wall is secured to a metal mounting shell for mounting of the stator housing to a bearing housing; and wherein said second inner radially extending surface is formed by an inner surface of a radially inwardly extending flange of said metal mounting shell.

14. A bearing isolator seal according to claim 13, wherein said peripheral wall has a tapering section for guiding lubricant to said gravity drain ports.

15. A bearing isolator seal according to claim 10, wherein said radial flange is provided with an axially extending end portion of sufficient mass to serve as a means for causing said centrifugal forces to produce said displacement of the radial flange.

16. A bearing isolator seal according to claim 10, wherein said peripheral wall has a tapering section for guiding lubricant to said gravity drain ports.

17. A bearing isolator seal according to claim 1, wherein said stator housing has a first and a second said inner radially extending face in an opposed relationship to each other, and a first and a second said annular flange in an opposed relationship to each other, and wherein said rotor has a first and a second said radial flange, each of said radial flanges cooperating with a respective one of said first and second radially extending faces and annular flanges.

18. A bearing isolator seal according to claim 17, wherein said stator housing is formed of a pair of identical stator housing rings disposed in mirror image relationship to each other.

19. A bearing isolator seal according to claim 18, wherein said stator housing rings are secured together by a mounting shell for mounting of the stator housing to a bearing housing.

20. A bearing isolator seal according to claim 17, wherein said radial flanges are each provided with an axially extending end portion of sufficient forces to produce said displacement of the radial flange.

21. A rotary shaft bearing isolator seal comprising:
a stator housing having an inner radially extending face;
an annular flange of substantially frusto-conical shape extending radially and axially inwardly from a larger diameter end fixed to said radially extending face to a smaller diameter free end;
a rotor disposed within said stator housing and having a peripheral radial flange, said peripheral radial flange being provided with a sealing surface for engaging with said annular flange;
wherein drain ports are provided in a wall of the stator housing defining said inner radially extending face at locations disposed in proximity to a radially inner side of said frusto-conical annular flange; and
wherein said rotor is provided with radially extending pumping grooves in a surface t hereof that is disposed substantially parallel and in close proximity to a portion of said radially extending face of the stator as a means for propelling lubricant, entering between said rotor and said portion of the radially extending face of the stator housing, toward the radially inner side of the annular flange for discharge through said drain ports under dynamic sealing conditions.

22. A bearing isolator seal according to claim 21, wherein said pumping grooves are of V-shaped cross section.

23. A bearing isolator seal according to claim 21, wherein said stator housing has a first and a second said inner radially extending face in an opposed relationship to each other, and upon which a first and a second said annular flange is provided, respectively; wherein said drain ports are provide in proximity with each of said first and second annular flanges; and wherein said pumping grooves are provide on each of axially opposite sides of said rotor.

24. A bearing isolator seal according to claim 23, wherein said rotor has a frusto-conical peripheral wall facing each annular flange which increases a diameter in a direction toward said drain ports.

25. A bearing isolator seal according to claim 21, wherein said rotor has a frusto-conical peripheral wall facing said annular flange which increases a diameter in a direction toward said drain ports.

26. A bearing isolator seal according to claim 21, wherein said annular flange is provided on a first stator housing ring, said first stator housing ring having a peripheral wall; and wherein a second inner radially extending surface is formed by an inner surface of an annular, disc-like, second stator housing ring that is snapped into an inner circumferential groove in an inner surface of the peripheral wall of the first stator housing ring.

* * * * *

UNITED STATES PATENT AND TRADEMARK OFFICE
CERTIFICATE OF CORRECTION

PATENT NO. : 4,817,966
DATED : April 4, 1989
INVENTOR(S) : Richard Borowski

It is certified that error appears in the above-identified patent and that said Letters Patent is hereby corrected as shown below:

"In Column 8, line 32, "annular" has been corrected to --radial--."

Signed and Sealed this

Twenty-third Day of March, 1993

Attest:

STEPHEN G. KUNIN

Attesting Officer

Acting Commissioner of Patents and Trademarks